United States Patent
Chawla

(10) Patent No.: US 7,246,301 B2
(45) Date of Patent: Jul. 17, 2007

(54) METHOD FOR STORAGE ARRAY ERROR CORRECTION

(75) Inventor: Rohit Chawla, Waco, TX (US)

(73) Assignee: Dell Products L.P., Round Rock, TX (US)

( * ) Notice: Subject to any disclaimer, the term of this patent is extended or adjusted under 35 U.S.C. 154(b) by 409 days.

(21) Appl. No.: 10/461,859

(22) Filed: Jun. 13, 2003

(65) Prior Publication Data

US 2004/0255223 A1 Dec. 16, 2004

(51) Int. Cl.
*G11C 29/00* (2006.01)

(52) U.S. Cl. .......................... 714/764; 714/727; 714/6; 714/770

(58) Field of Classification Search ............... None
See application file for complete search history.

(56) References Cited

U.S. PATENT DOCUMENTS

| | | | | |
|---|---|---|---|---|
| 5,568,629 A * | 10/1996 | Gentry et al. | ............... | 711/114 |
| 5,613,059 A * | 3/1997 | Stallmo et al. | ............... | 714/6 |
| 5,812,753 A | 9/1998 | Chiariotti | ............... | 395/182.04 |
| 6,016,552 A * | 1/2000 | Lee et al. | ............... | 714/6 |
| 6,021,450 A | 2/2000 | Yoshizawa et al. | ......... | 710/128 |
| 6,421,760 B1 | 7/2002 | McDonald et al. | ......... | 711/114 |
| 6,425,052 B1 * | 7/2002 | Hashemi | ............... | 711/114 |
| 6,516,425 B1 | 2/2003 | Belhadj et al. | ............... | 714/6 |
| 6,928,578 B2 * | 8/2005 | Archibald et al. | ............... | 714/6 |
| 6,934,904 B2 * | 8/2005 | Talagala et al. | ............... | 714/770 |
| 2002/0194427 A1 * | 12/2002 | Hashemi | ............... | 711/114 |
| 2004/0250017 A1 * | 12/2004 | Patterson et al. | ............... | 711/114 |

OTHER PUBLICATIONS

Holland et al., "Fast, On-Line Failure Recovery in Redundant Disk Arrays", Jun. 22-24, 1993, IEEE, 23rd Symposium on Fault Tolerant Computing, pp. 422-431.*
Holland et al., "Architecures and Algorithms for On-Line Recovery in Redundant Disk Arrays", Jul. 1994, Journal of Distributed and Parallel Databases, vol. 2, pp. 295-335.*

* cited by examiner

*Primary Examiner*—Albert Decady
*Assistant Examiner*—John P. Trimmings
(74) *Attorney, Agent, or Firm*—Baker Botts L.L.P.

(57) ABSTRACT

A method for error correction in a storage array is provided in which a data section comprising multiple data stripes are read following an indication that a volume of the storage array is degraded. An evaluation is made as to whether the data of the data section has been compromised. The evaluation may be performed by an exclusive-OR checksum operation performed on the bits of the data section. If the data of the data section has not been compromised, a rebuild of the multiple data stripes in the affected volume is not required and is not performed. If the data of the data section has been compromised, a rebuild of the data of the data stripes of the evaluated data section is performed in the affected volume. This process continues until all of the data stripes of the storage array have been evaluated.

17 Claims, 2 Drawing Sheets

METHOD FOR STORAGE ARRAY ERROR CORRECTION

TECHNICAL FIELD

The present disclosure relates generally to the field of external storage systems and networks, and, more particularly, to a system and method for error correction.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a storage system or storage network that includes some measure of fault tolerant data storage. One example of a fault tolerant data storage system is a RAID (Redundant Array of Inexpensive Disks) storage system. RAID storage systems combine multiple disks into an array of disk drives to obtain performance, capacity, and reliability advantages over other storage techniques, including, for example, a single large drive. RAID Level 5 is an example of fault tolerant data storage system. A RAID Level 5 storage system is characterized by the striping of data across disks in the storage system. A set of parity bits generated by an exclusive-OR of the data bits is stored on a disk that is separate from the striped data. The parity bits for the respective stripes of data are distributed in the disks of the storage system so that each disk will likely contain both data bits for a stripe of data and parity bits related to some other stripe of data. In a RAID Level 5 storage system, it is typical that no single disk includes all of the parity bits. RAID Level 5 is often referred to as a rotating parity storage.

In a RAID Level 5 storage system, if one of the disks fails, the data on the disk can be rebuilt. The rebuild of the failed or degraded volume is accomplished by performing an exclusive-OR operation with the data on the other disks in the data stripe, including the parity bits associated with the data stripe. The rebuild of a degraded volume is often a tedious process, occurring one data row or data stripe at a time. In the case of a RAID Level 5 storage system having three disks, which is the minimum for a RAID Level 5 storage system, the rebuild of a single stripe of data involves two reads —one read from each non-degraded volume—and a write of data to the degraded volume. For a Level 5 RAID array having N number of drives, the rebuild of a degraded volume will require N−1 reads and a write to the degraded volume. Assuming that a typical stripe of data is 64 KB in size, the rebuild of a degraded volume is a time-consuming process, especially for those Level 5 RAID arrays having multiple drives and a large volume of data storage per drive.

SUMMARY

In accordance with the present disclosure, a method and system is provided for performing an error correction routine on a storage system. As is common in Level 5 RAID storage systems, data is written across multiple volumes or disks in stripes. The method disclosed herein involves reading in a section of data from the volumes when a volume of the storage system is identified as degraded. The section of data will include multiple stripes of the storage system. The section of data is evaluated to determine if any of the data in the section of data has been compromised. This evaluation may be accomplished by performing an exclusive-OR checksum operation on the bits in the section of data. If it is determined that the section of data has not been compromised, no data in the section of data is in need of a rebuild, and a rebuild is not performed. If it is determined that data in the section of data has been compromised, that portion of the degraded volume associated with the data stripes of the section of data is rebuilt.

One technical advantage of the error correction method disclosed herein is that the method allows for the selective rebuild of data in volumes identified as being degraded. In some instances, a volume will be identified as being degraded even though all of the data in the volume is intact and not compromised. As an example, if the storage system undergoes a temporary power loss, In this event, it is not necessary to rebuild the entire volume. The error correction method disclosed herein identifies that the data of the identified volume is not compromised, thereby avoiding the necessity of rebuilding the volume and the computing and I/O operations associated with such a rebuild.

Another technical advantage of the error correction method disclosed herein is an error correction method that permits the focused correction of those portions of the degraded volume that do in fact contain errors. A data section that is a multiple of several data stripes is selected for evaluation. If this section of data is identified as being compromised, then the stripes comprising this section of data are rebuilt in the degraded volume. Other multiples of data stripes will be likewise evaluated, and only those data sections having compromised data will be rebuilt. In this manner, significant portions of the degraded volume that were not compromised will not be rebuilt, thereby avoiding needless rebuilds of uncompromised data while allowing sections identified as being compromised to be rebuilt with data in the other volumes of the storage array. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure concerns an error correction routine for a storage subsystem. The technique described herein evaluates, for blocks of data comprising a multiple of the stripe size, whether data in the stripe multiple is degraded. For those stripe multiples that are evaluated as being degraded, a rebuild of the data in the degraded volume for each of the stripes in the stripe multiple is performed. If the data in the evaluated stripe multiple has not been degraded, the data in the degraded volume need not be rebuilt for those stripes in the stripe multiple.

Figure 1:
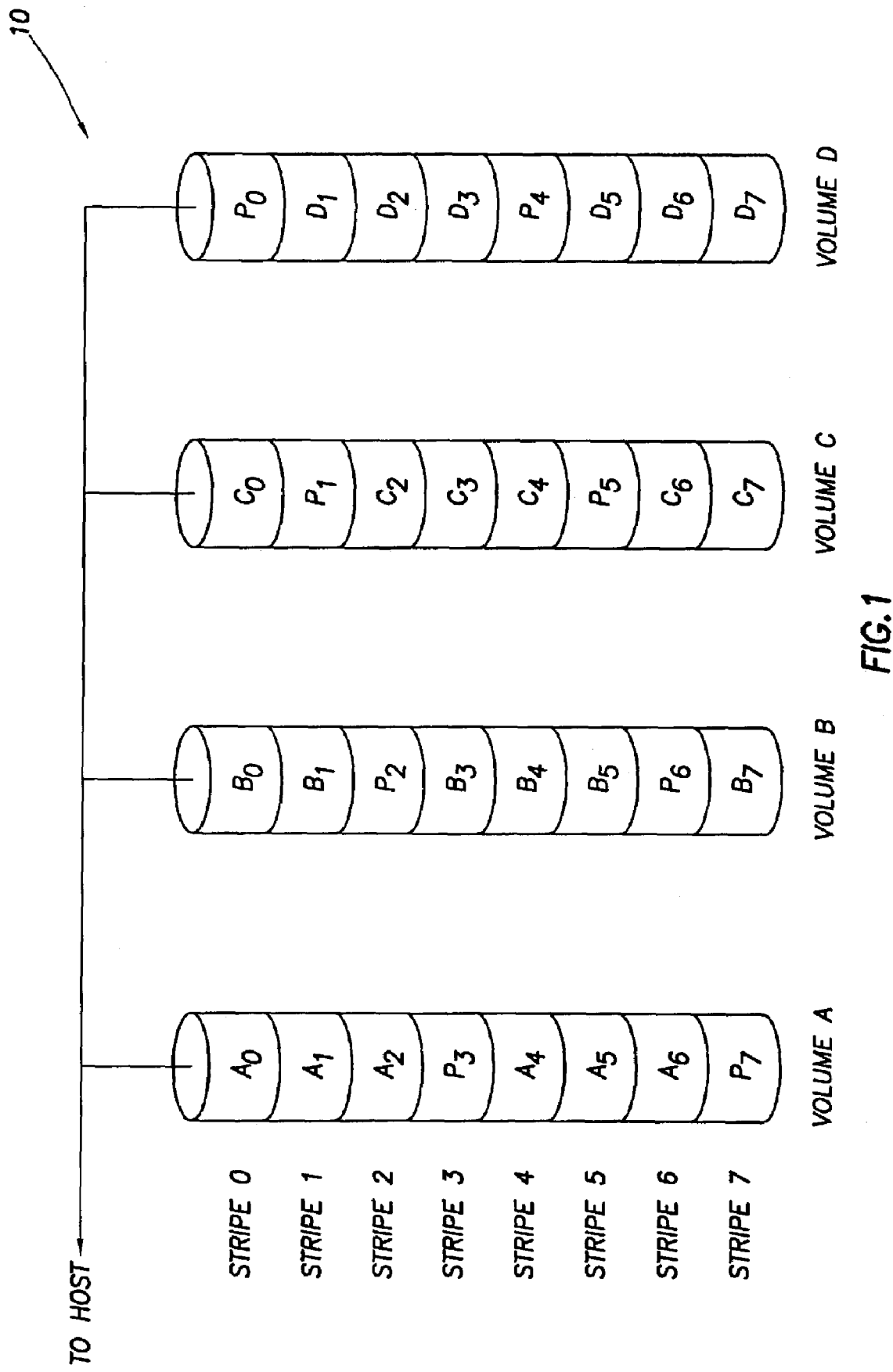
FIG. 1 is a diagram of the volumes and data stripes of a Level 5 Raid storage array.

Shown generally at 10 in FIG. 1 is a diagram of Level 5 RAID storage array that includes four volumes, labeled Volume A through Volume D. Each of the four volumes in the example of FIG. 1 includes eight stripes or rows of data, labeled Stripe 0 through Stripe 7. It should be recognized that the configuration of the RAID array of FIG. 1 is simply an illustration of a RAID array. It should be recognized that RAID array may have more or few disks or volumes with more or fewer stripes or rows. The size or width of each stripe of data may be, for example, 64 KB per volume. It should be recognized that the technique described herein is not dependent on a stripe of a particular size. With reference to Stripe 0, data is stored in Volume A, Volume B, and Volume C. The parity bits for Stripe 0, which are the result of an exclusive-OR operation performed on the content of Stripe 0 in Volume A, Volume B, and Volume C, are stored in Volume D and labeled P0. As a second example of the data structure of the RAID Array 10, with reference to Stripe 7, data is stored Volume B, Volume C, and Volume D. The parity bits for Stripe 7, which are the result of an exclusive-OR operation performed on the content of Stripe 7 in Volume B, Volume C, and Volume D, are stored in Volume A and labeled P7. If, for example, Volume C were to fail or otherwise be identified as a degraded volume, the data in each stripe of Volume C would be rebuilt with the data in the other three volumes of RAID array 10.

Figure 2:
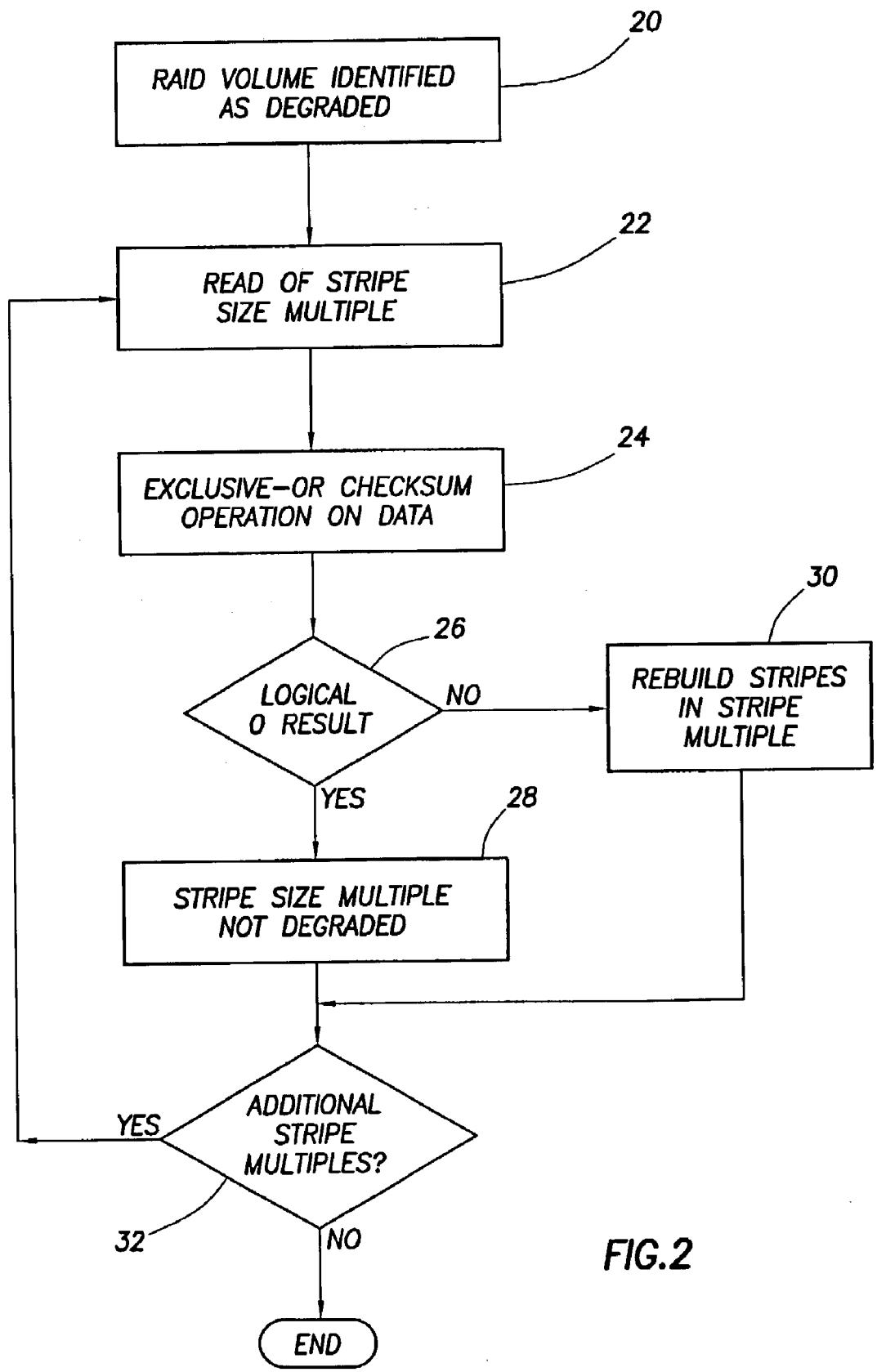
FIG. 2 is a flow diagram of method steps for rebuilding a degraded storage volume.

Shown in FIG. 2 is a flow diagram of the method for rebuilding a degraded RAID volume. At step 20, a RAID volume or disk is identified as being degraded. A volume may be identified as being degraded for any of several reasons, including the mechanical failure of one of the individual hard drives in the volume or a temporary loss of power to the volume. Following the identification of a degraded RAID volume at step 20, data constituting a multiple of the stripe size is read from the RAID array. As an example, assuming a stripe size of 64 KB, a four-fold multiple of 64 KB would be 256 KB. A read of multiple stripes having a combined size of 256 KB would constitute a read of four stripes. The read of the multiple stripes would include a read of the data in all the stripes, including the data in the RAID volume identified as the degraded volume.

As an example, assuming that each of the stripes in RAID array 10 of FIG. 1 has a stripe size of 64 KB, a multiple stripe read of 256 KB could include a read of Stripes 0–3. Once the stripe multiple has been read at step 22, an exclusive-OR checksum operation is performed on the data of the stripe multiple. The data of the stripe multiple includes both the data bits and the parity bits of each stripe. If it is determined at step 26 that the result of the exclusive-OR checksum operation is a logical 0, the data in the stripes of the stripe multiple have not been affected by condition that caused the affected RAID volume to be identified as degraded. Because the data of the stripes of the evaluated stripe multiple is intact and has not been compromised (step 28), a rebuild of the data in the stripes of the stripe multiple is not necessary and is not performed, thereby reducing the number of reads and writes to the volumes of the RAID array. The data in the stripe multiple is said to be compromised if the result of the exclusive-OR checksum operation is something other than a logical 0.

If it is determined at step 26 that the result of the exclusive-OR checksum operation is not a logical 0, the data in the stripe multiple has been compromised, and the stripes of the stripe multiple are rebuilt in the degraded volume (step 30). This rebuild process can be accomplished by traditional means by performing, for each stripe in the stripe multiple, a bit-wise exclusive-OR operation on the data of the undegraded volumes in the stripe (i.e., an exclusive-OR operation is performed among all of the bits of a certain position to produce a bit of that position for the degraded volume). At step 32, following the determination that the stripe multiple is not degraded (steps 26 and 28) or the rebuild of data in the degraded volume for those stripes in the stripe multiple (step 30), it is determined at step 32 whether all of the stripes of the RAID array have been read for the purpose of determining in steps 24 and 26 whether the data of the stripes have been compromised. Once all of the stripes of the RAID array have been evaluated, the process of FIG. 2 ends. In the example of FIG. 1, assuming a stripe size of four 64 KB stripes, two stripe multiples would need to be read in to evaluate all of the data of the RAID array.

It should be recognized that the size of the stripe multiple can be less than or greater than four times the size of a single stripe. The size of the stripe multiple should be sufficiently large so that if it is determined that the data of the stripe multiple has not been compromised, a significant savings in processing time is achieved by avoiding a rebuild of each stripe of the stripe multiple. It should be recognized that it is possible for the stripe multiple to be sufficiently large that all stripes of the RAID array are read in for the purpose of evaluating data as part of a single read of the RAID array. Although the present disclosure has been described in detail, it should be understood that various changes, substitutions, and alterations can be made hereto without departing from the spirit and the scope of the invention as defined by the appended claims.

What is claimed is:

1. A method for analyzing a Level 5 RAID array when a volume of the Level 5 RAID array is identified as degraded to determine whether at least some portion of the Level 5 RAID array should be rebuilt, comprising the steps of reading a section of data in the Level 5 RAID array, the section of data having a size that is a multiple of the stripe size of the data of the Level 5 RAID array;

determining whether the data in the section of data has been compromised;

rebuilding the data in the section of data of the degraded volume only if it is determined that the data in the section of data has been compromised, wherein the data in the section of data of the degraded volume is not rebuilt if it is determined that the data in the section of data has not been compromised; and for each additional section of data in the Level 5 RAID array, performing the steps of reading, determining, and rebuilding until all stripes of the Level 5 RAID array have been read for the purpose of determining whether the data in the sections of the Level 5 RAID array has been compromised.

2. The method for analyzing a Level 5 RAID array when a volume of the Level 5 RAID array is identified as degraded to determine whether at least some portion of the Level 5 RAID array should be rebuilt of claim 1, wherein the section of data comprises four stripes of the Level 5 RAID array.

3. The method for analyzing a Level 5 RAID array when a volume of the Level 5 RAID array is identified as degraded to determine whether at least some portion of the Level 5 RAID array should be rebuilt of claim 1, wherein the step of determining whether the data in the section of data has been compromised comprises the step of performing an exclusive-OR checksum operation on the data in the section of data.

4. The method for analyzing a Level 5 RAID array when a volume of the Level 5 RAID array is identified as degraded to determine whether at least some portion of the Level 5 RAID array should be rebuilt of claim 1, wherein the step of rebuilding the data in the section of data of the degraded volume comprises the step of rebuilding each stripe of data in the section of data of the degraded raid volume with data in the stripe of data from the volumes other than the degraded volume.

5. The method for analyzing a Level 5 RAID array when a volume of the Level 5 RAID array is identified as degraded to determine whether at least some portion of the Level 5 RAID array should be rebuilt of claim 4, wherein the step of rebuilding the data in the section of data of the degraded volume comprises the step of rebuilding each stripe of data in the section of data of the degraded raid volume by performing a bit-wise exclusive-OR operation on the data in the stripe of data from the volumes other than the degraded volume.

6. The method for analyzing a Level 5 RAID array when a volume of the Level 5 RAID array is identified as degraded to determine whether at least some portion of the Level 5 RAID array should be rebuilt of claim 1, wherein the step of reading a section of data in the Level 5 RAID array comprises the step of reading in all of the data of the Level 5 RAID array.

7. The method for analyzing a Level 5 RAID array when a volume of the Level 5 RAID array is identified as degraded to determine whether at least some portion of the Level 5 RAID array should be rebuilt of claim 1,
  wherein the step of determining whether the data in the section of data has been compromised comprises the step of performing an exclusive-OR checksum operation on the data in the section of data; and
  wherein the step of rebuilding the data in the section of data of the degraded volume comprises the step of rebuilding each stripe of data in the section of data of the degraded raid volume by performing a bit-wise exclusive-OR operation on the data in the stripe of data from the volumes other than the degraded volume.

8. A method for error correction in a storage array having a plurality of volumes and data striped in a stripe size across the volumes and wherein a volume of the storage array is identified as a degraded volume, comprising the steps of:
  reading in a section of data that has a size that is a multiple of the stripe size;
  determining whether the data in the data section has been compromised;
  rebuilding the data in the data section of the volume identified as the degraded volume only if it is determined that the data in the data section has been compromised and refraining from rebuilding the data in the data section if it is determined that the data in the data section has not been compromised; and
  for each additional section of data in the storage array, performing the steps of reading, determining, and rebuilding until all stripes of data in the storage array have been read for the purpose of determining whether the data in the sections of the storage array has been compromised.

9. The method for error correction in a storage array of claim 8, wherein the stripe size is 64 KB and the data section that is a multiple of the stripe size is 256 KB.

10. The method for error correction in a storage array of claim 8, wherein the size of the data section is four times the stripe size.

11. The method for error correction in a storage array of claim 8, wherein the step of determining whether the data in the data section has been compromised comprises the step of performing an exclusive-OR checksum operation on the bits in the data section.

12. The method for error correction in a storage array of claim 8, wherein the step of rebuilding the data in the data section of the volume identified as the degraded volume comprises the step of rebuilding the data in the data section of the degraded volume with data from the data section of volumes other than the degraded volume.

13. The method for error correction in a storage array of claim 12, wherein the step of rebuilding the data in the data section of the volume identified as the degraded volume comprises the step of performing a bit-wise exclusive-OR operation on the data in the stripes of the data section for those volumes other than the degraded volume.

14. The method for error correction in a storage array of claim 13, wherein the storage array is a Level 5 RAID storage array.

15. The method for error correction in a storage array of claim 8, wherein the step of reading in a section of data comprises the step of reading in all of the data in the volumes of the storage array.

16. A method for evaluating the presence of compromised data in a volume in a Level 5 RAID storage array upon the identification of a degraded volume in the Level 5 RAID storage array, comprising the steps of:
  reading in a section of data having a size that is a multiple of the stripe size;
  determining for the data section whether the data in the data section has been compromised;
  rebuilding in the degraded volume the portion of the degraded volume associated with the data section only if it is determined that the data in the data section of data has been compromised and refraining from rebuilding any data in the data section if it is determined that the data in the data section has not been compromised; and
  for each additional section of data in the Level 5 RAID storage array, performing the steps of reading, determining, and rebuilding until all data stripes of the Level 5 RAID storage array have been evaluated for the purpose of determining whether the data in the sections of the Level 5 RAID storage array has been compromised.

17. The method for evaluating the presence of compromised data in a volume in a Level 5 RAID storage array of claim 16, wherein the data section comprises all of the data stripes of the storage array.

* * * * *